US010131544B2

(12) United States Patent
Sheng et al.

(10) Patent No.: US 10,131,544 B2
(45) Date of Patent: Nov. 20, 2018

(54) GRAPHENE/POROUS IRON OXIDE NANOROD COMPOSITE AND MANUFACTURING METHOD THEREOF

(71) Applicant: SOOCHOW UNIVERSITY, Suzhou (CN)

(72) Inventors: Weiqin Sheng, Suzhou (CN); Qiang Lv, Suzhou (CN); Hesun Zhu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 15/536,204

(22) PCT Filed: Sep. 14, 2015

(86) PCT No.: PCT/CN2015/089491
§ 371 (c)(1),
(2) Date: Jun. 15, 2017

(87) PCT Pub. No.: WO2017/004892
PCT Pub. Date: Jan. 21, 2017

(65) Prior Publication Data
US 2017/0352446 A1    Dec. 7, 2017

(30) Foreign Application Priority Data

Jul. 3, 2015   (CN) .......................... 2015 1 0382555

(51) Int. Cl.
*H01B 1/02*        (2006.01)
*C01G 49/06*    (2006.01)
(Continued)

(52) U.S. Cl.
CPC .......... *C01B 32/194* (2017.08); *C01B 32/198* (2017.08); *C01G 49/06* (2013.01); *H01B 1/02* (2013.01); *B82Y 30/00* (2013.01); *B82Y 40/00* (2013.01); *C01P 2002/72* (2013.01); *C01P 2002/82* (2013.01); *C01P 2004/03* (2013.01); *C01P 2004/04* (2013.01); *C01P 2004/16* (2013.01); *C01P 2004/80* (2013.01)

(58) Field of Classification Search
None
See application file for complete search history.

(56) References Cited

FOREIGN PATENT DOCUMENTS

| CN | 102543270 A | 7/2012 |
|----|-------------|--------|
| CN | 102649589 A | 8/2012 |
| CN | 103367720 A | 10/2013 |

OTHER PUBLICATIONS

English text translation for CN 102649589 A , accessed from the Espacenet website, copy attached to the case file as a PDF pp. 1-8. (Year: 2012).*

(Continued)

*Primary Examiner* — Katie L. Hammer
(74) *Attorney, Agent, or Firm* — SZDC Law P.C.

(57) ABSTRACT

The present invention discloses a graphene/porous iron oxide nanorod composite and a method for preparing the same. The composite includes graphene and $Fe_2O_3$ nanoparticles loaded on the graphene. The $Fe_2O_3$ nanoparticles have a honeycomb porous structure. The synthesis method of the composite is simple and the raw materials are inexpensive.

4 Claims, 5 Drawing Sheets

(51) Int. Cl.
*C01B 31/02* (2006.01)
*C01B 32/194* (2017.01)
*C01B 32/198* (2017.01)
*B82Y 30/00* (2011.01)
*B82Y 40/00* (2011.01)

(56) References Cited

OTHER PUBLICATIONS

Translation of the Written Opinion of the International Searching Authority for priority application No. PCT/CN2015/089491, copy attached as a PDF. (Year: 2016).*
Shou, Qingliang, "Synthesis of Nanocomposites of Iron Oxides and Graphene and Their Supercapacitor Properties", Science-Engineering (A), China Master's Theses Full-Text Database, 2012, No. 08, Aug. 15, 2012 (Aug. 8, 2012), B020-126.

* cited by examiner

GRAPHENE/POROUS IRON OXIDE NANOROD COMPOSITE AND MANUFACTURING METHOD THEREOF

The present application is a national phase application of PCT/CN2015/089491, filed on Sep. 14, 2015, which claims the priority of Chinese Patent Application Ser. No. 201510382555.1 filed on Jul. 3, 2015, and entitled "Graphene/Porous Iron Oxide Nanorod Composite and Method for Preparing the same", the entire contents of which are hereby incorporated by reference.

FIELD OF THE INVENTION

The present invention relates to the technical field of material chemistry, and more particularly, to a graphene/porous iron oxide nanorod composite and a method for preparing the same.

DESCRIPTION OF THE RELATED ART

As a primary source of energy of portable devices, lithium batteries are being expanded continuously in application fields, including electronic engines and green energy and the like. Although some advances have been made commercially in lithium batteries, their use is limited in a wide range of application due to the disadvantages such as low energy storage and poor cycling stability. Therefore, currently, many researches focus on finding an efficient lithium battery electrode material, for example, a low dimensional metal oxide material. Among alternative negative electrode materials, $Fe_2O_3$, as one of transition metal oxides, has attracted increasing attention, because its theoretical capacity (1007 mAh g$^{-1}$) is much higher than that of graphite and other transition metal oxides (such as $SnO_2$) and it is inexpensive, abundant and environmentally friendly.

However, $Fe_2O_3$ materials have poor conductivity and exhibit a large volume expansion during charge and discharge, this hinders their practical applications in lithium batteries. The way to overcome this problem is to seek an active material having a high specific surface area and a short diffusion path for compounding with it. A large specific surface area enables metal oxides to have more lithium storage sites and larger electrode-electrolyte contact area for easy diffusion of lithium ions. Therefore, due to huge specific surface area and good conductivity, graphene is an ideal alternative material.

In addition, numerous studies show that fibroin can regulate the nano-structures, hydrophilicity and hydrophobicity of nanomaterials by controlling the self-assembly, thereby providing a controllable template for synthesizing copper oxide, silver and other inorganic nanoparticles. Synthesis of the materials such as α-$Fe_2O_3$/graphene, α-$Fe_2O_3$/CNTs, α-$Fe_2O_3$/carbon has been reported, but synthesis of a porous $Fe_2O_3$ nanorod/graphene composite regulated by fibroin has not been reported.

SUMMARY OF THE INVENTION

In order to solve the technical problems above, an object of the present invention is to provide a graphene/porous iron oxide nanorod composite and preparation method thereof. The raw materials used in synthesis are inexpensive and readily available, and the synthesis method is simple.

In one aspect, the present invention discloses a graphene/porous iron oxide nanorod composite, including graphene and $Fe_2O_3$ nanoparticles loaded on the graphene, the $Fe_2O_3$ nanoparticles have a honeycomb porous structure.

Preferably, the $Fe_2O_3$ nanoparticles have a rod-shaped morphology.

In another aspect, the present invention also discloses a method for preparing a graphene/porous iron oxide nanorod composite, the method comprises the steps of:

(1) mixing graphene oxide with a fibroin solution, and adding hydrazine hydrate for reduction after pH is adjusted to alkaline, to obtain a graphene/fibroin composite;

(2) adding an iron source to the graphene/fibroin composite, and further stirring until complete dissolution to get a mixture;

(3) pouring the mixture into a reactor and performing a reaction at 120-200° C. for 8-36 h;

(4) naturally cooling to room temperature after the end of the reaction, centrifuging and drying the product, to obtain a solid powder; and (5) calcinating the solid powder in an inert atmosphere at 320-450° C. for 3-8 h, and naturally cooling to room temperature, to get the nanorod composite.

Preferably, the weight ratio of the graphene oxide to fibroin is less than or equal to (not greater than) 1:4.

Preferably, the weight ratio of the graphene oxide to hydrazine hydrate is 1:(0.0004-20).

Preferably, the iron source is $FeCl_3.6H_2O$, and the weight ratio of the graphene oxide to $FeCl_3.6H_2O$ is 1:(20-60).

Preferably, in the step (1) the pH is 8-11.

By means of the above technical solutions, the present invention has the following advantages: in the present invention, iron oxide nanoparticles are compounded with graphene, graphene has a large specific surface area and a good conductivity, and enhances the discharge capacity of the iron oxide materials. The pore structure of iron oxide increases the specific surface area of iron oxide nanoparticles, such that they have more lithium storage sites and larger contact area. In the invention, fibroin induces iron oxide nanoparticles to form a rod-shaped structure and honeycomb holes, raw materials of the invention are inexpensive and readily available, has good biocompatibility and no contamination to the environment, and can be easily removed.

BRIEF DESCRIPTION OF THE DRAWINGS

The accompanying drawings are intended for further understanding of the invention as a part of the present application. The exemplary embodiments and description thereof of the invention are used for illustrating the present invention and are not intended to limit the invention in any way. In the drawings.

DETAILED DESCRIPTION OF THE PREFERRED EMBODIMENTS

The present invention will be explained in more detail below with reference to the drawings and in connection with embodiments.

Embodiment 1

A method for preparing a graphene/porous iron oxide nanorod composite, comprises the following steps:

(1) 0.05 g graphene oxide was mixed with 16 mL of fibroin solution of 5.06 wt %, pH was adjusted to 10, and 0.2 mL hydrazine hydrate was added to induce reduction, and a graphene-fibroin nanofiber composite was obtained;

(2) 2.15 g $FeCl_3.6H_2O$ was added into the graphene-fibroin nanofiber composite, and stirring was continuously until complete dissolution to get a mixture;

(3) the mixture was poured into a reactor and reaction was carried out at 160° C. for 20 h;

(4) after completion of the reaction, the resulting mixture was naturally cooled to room temperature, and the product was centrifuged, washed, and finally dried in vacuum to obtain a solid powder; and (5) the resultant solid powder was calcinated in a vacuum tubular furnace in an argon atmosphere at 400° C. for 5 h, and then was naturally cooled to room temperature to get the nanorod composite.

Figure 1:
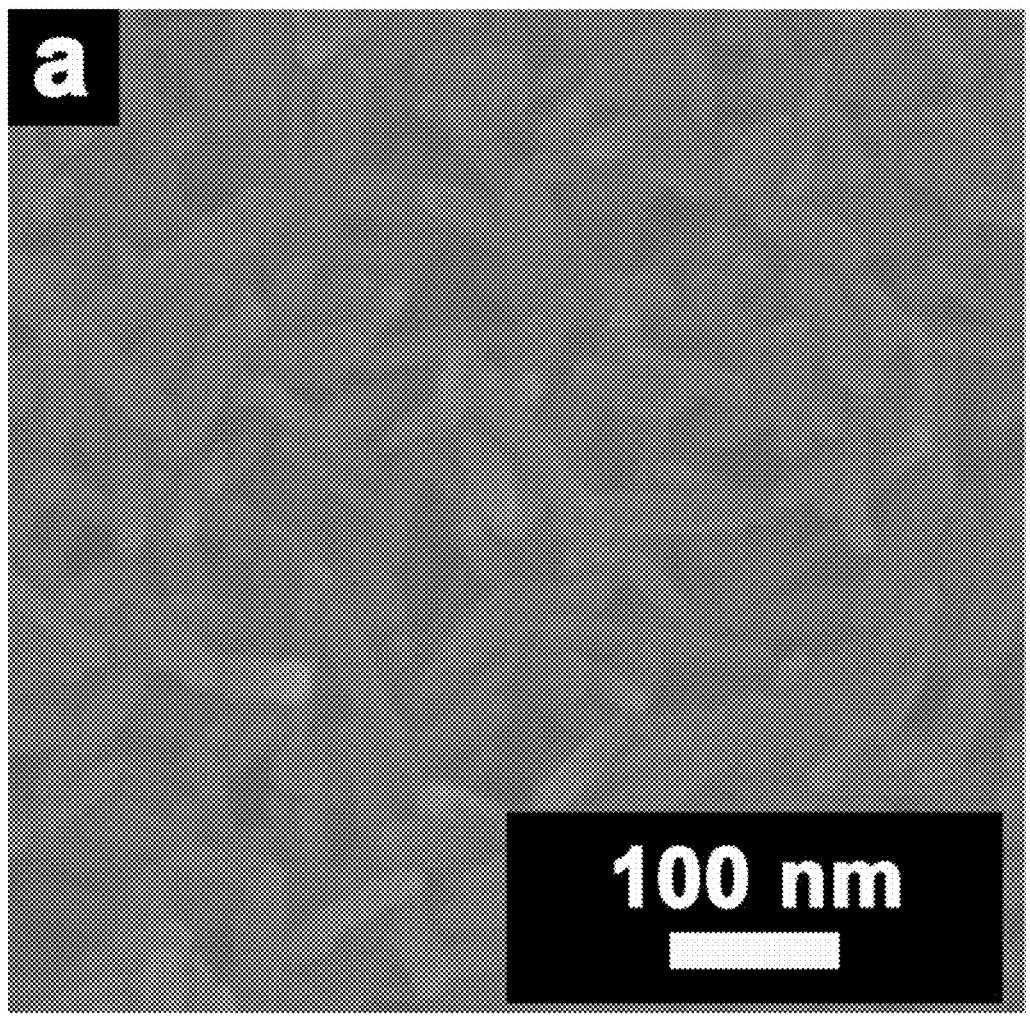
FIG. 1 is an SEM image of a sample in an embodiment 1 according to the present invention.
Figure 2:
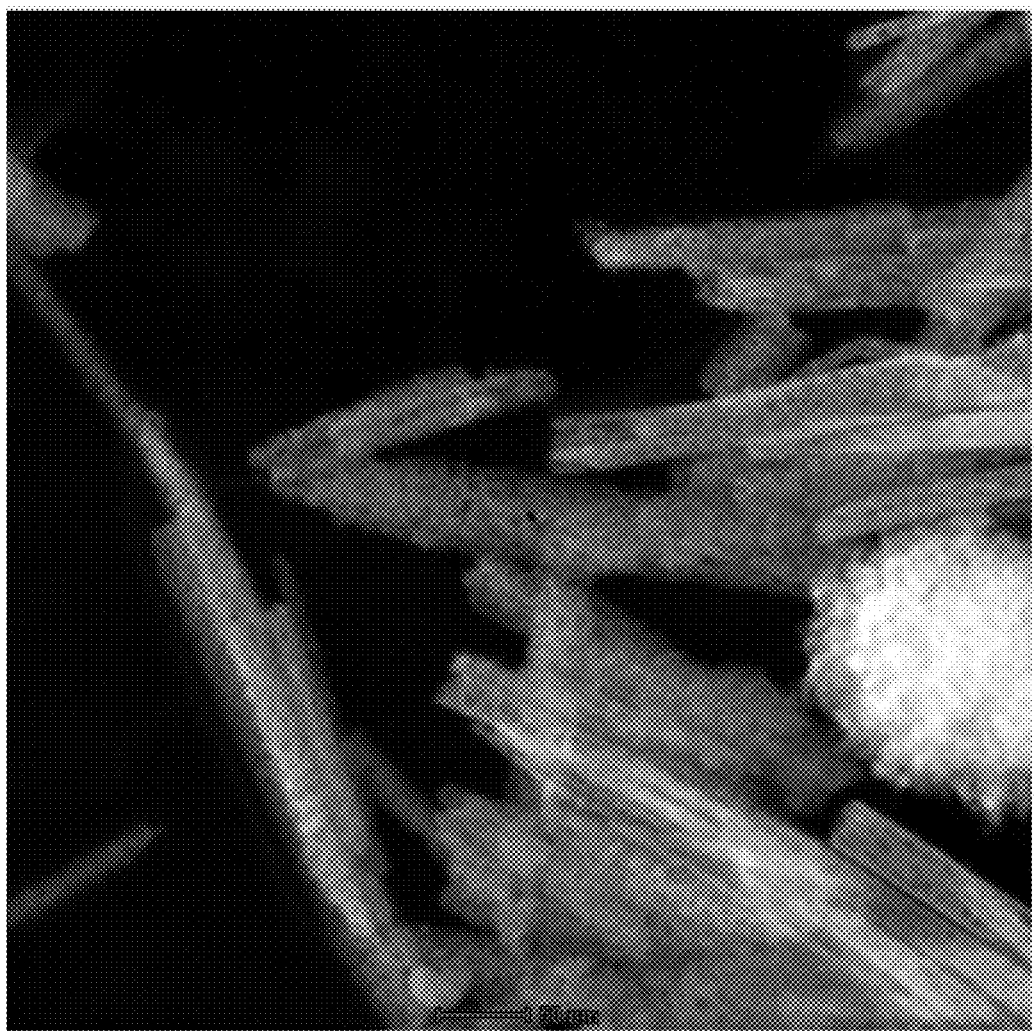
FIG. 2 is a TEM image of the sample in the embodiment 1 according to the present invention.
Figure 3:
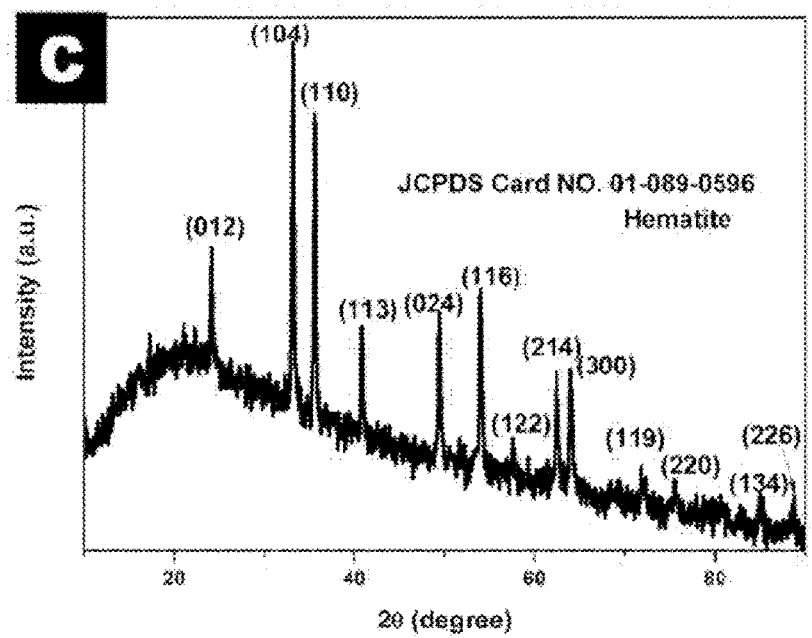
FIG. 3 is an XRD spectrum of the sample in the embodiment 1 according to the present invention.
Figure 4:
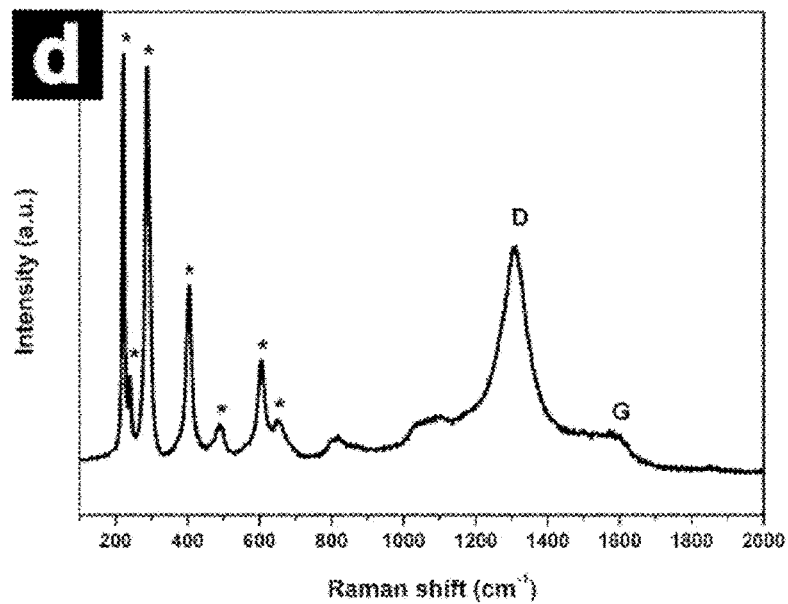
FIG. 4 is a Raman spectrum of the sample in the embodiment 1 according to the present invention.

FIG. 1 to FIG. 4 are an SEM image, TEM image, XRD spectrum, and Raman spectrum of a sample in embodiment 1 of the present invention, respectively. It can be seen from FIG. 1 and FIG. 2 that, the sample prepared by the method appears a one dimensional rod-shaped structure. It can be seen from FIG. 2 that, the rod-shaped iron oxide nanoparticles have honeycomb holes thereon. FIG. 3 shows that the sample is iron oxide. FIG. 4 further shows that the product is a composite of iron oxide with graphene.

Embodiment 2

A method for preparing a graphene/porous iron oxide nanorod composite, comprises the following steps:

(1) 0.05 g graphene oxide was mixed with 0.19 mL of fibroin solution of 5.06 wt %, pH was adjusted to 10, and 1 mL hydrazine hydrate was added to induce reduction, and a graphene-fibroin nanofiber composite was obtained;

(2) 1 g $FeCl_3.6H_2O$ was added into the graphene-fibroin nanofiber composite, and stirring was continuously until complete dissolution to get a mixture;

(3) the mixture was poured into a reactor and reaction was carried out at 120° C. for 36 h;

(4) after completion of the reaction, the resulting mixture was naturally cooled to room temperature, and the product was centrifuged, washed, and finally dried in vacuum to obtain a solid powder; and (5) the resultant solid powder was calcinated in a vacuum tubular furnace in an argon atmosphere at 320° C. for 8 h, and then was naturally cooled to room temperature to get the nanorod composite.

Figure 5:
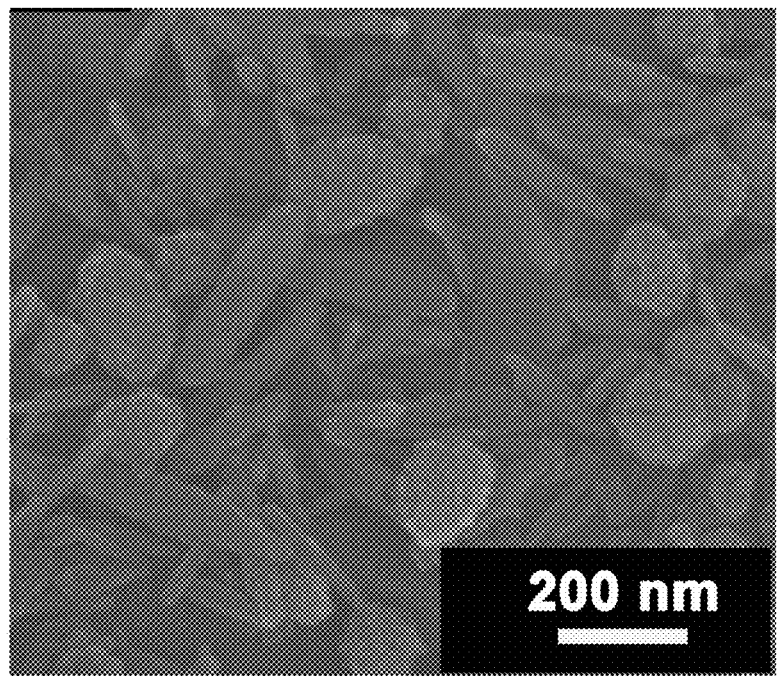
FIG. 5 is an SEM image of a sample in an embodiment 2 according to the present invention.

FIG. 5 is an SEM image, and it can be seen from the FIG. 5 that, parts of the composite are rod-shaped, and parts of are irregular-shaped.

Embodiment 3

A method for preparing a graphene/porous iron oxide nanorod composite, comprises the following steps:

(1) 0.05 g graphene oxide was mixed with 10 mL of fibroin solution of 5.06 wt %, pH was adjusted to 10, and 20 uμL hydrazine hydrate was added to induce reduction, and a graphene-fibroin nanofiber composite was obtained;

(2) 3 g $FeCl_3.6H_2O$ was added into the graphene-fibroin nanofiber composite, and stirring was continuously until complete dissolution to get a mixture;

(3) the mixture was poured into a reactor and reaction was carried out at 200° C. for 8 h;

(4) after completion of the reaction, the resulting mixture was naturally cooled to room temperature, and the product was centrifuged, washed, and finally dried in vacuum to obtain a solid powder; and (5) the resultant solid powder was calcinated in a vacuum tubular furnace in an argon atmosphere at 450° C. for 3 h, and then was naturally cooled to room temperature to get the nanorod composite.

Figure 6:
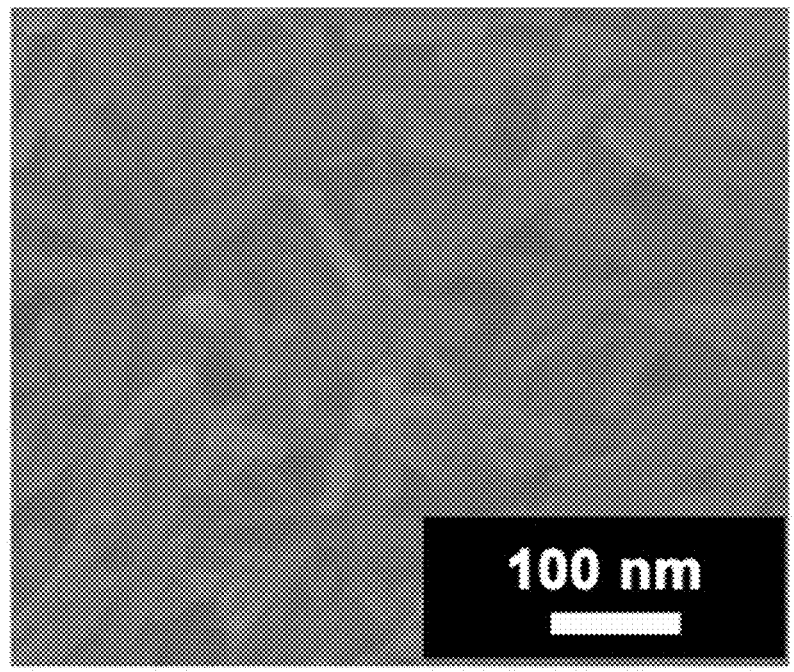
FIG. 6 is an SEM image of a sample in an embodiment 3 according to the present invention.

FIG. 6 is an SEM image of the sample, and it can be seen from the FIG. 6 that, the composite are rod-shaped.

Embodiment 4

A method for preparing a graphene/porous iron oxide nanorod composite, comprises the following steps:

The synthesis method in this embodiment 4 was similar to that in the embodiment 1, except that the step (5) was omitted.

Figure 7:
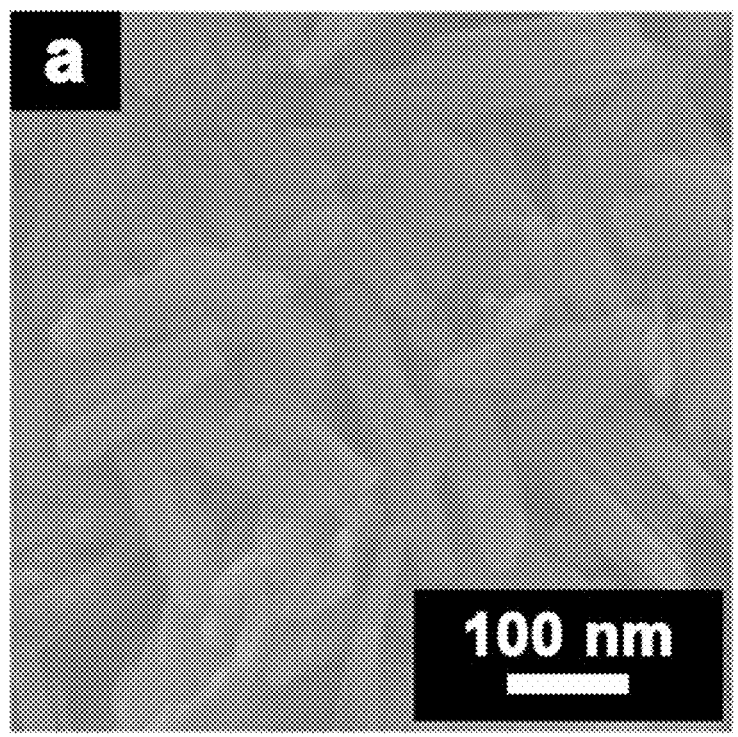
FIG. 7 is an SEM image of a sample in an embodiment 4 according to the present invention.
Figure 8:
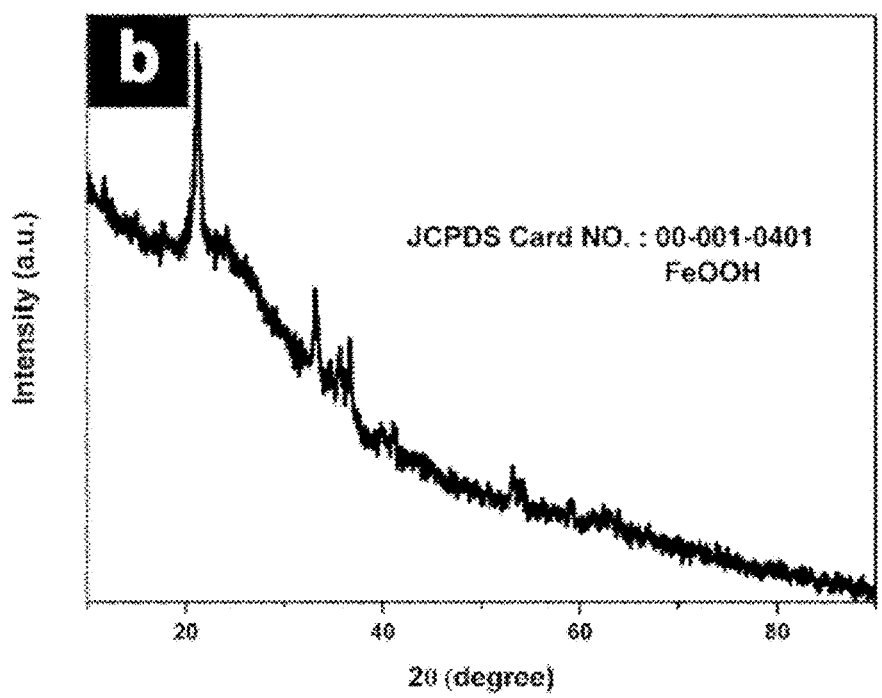
FIG. 8 is an XRD spectrum of the sample in the embodiment 4 according to the present invention.

FIG. 7 is an SEM image of a sample, and it can be seen from the FIG. 7 that, the composite also shows a rod-shaped structure before calcinating. FIG. 8 is an XRD spectrum of the sample, showing that the product before the composite is calcinated is FeOOH.

In conclusion, the present invention provides a method for preparing a graphene/porous iron oxide nanorod composite. The raw materials of the method are widely available, inexpensive, and the synthesis process is simple. In the present invention, iron oxide nanoparticles are compounded with graphene, graphene has a large specific surface area and a good conductivity, and enhances the discharge capacity of the iron oxide material. The pore structure of iron oxide increases the specific surface area of iron oxide nanoparticles, such that they have more lithium storage sites and larger contact area. In the invention, fibroin induces iron oxide nanoparticles to form a rod-shaped structure and a honeycomb structure, raw materials of the invention are inexpensive and readily available, has good biocompatibility and no contamination to the environment, and can be easily removed.

The above description is only preferred embodiments of the present invention and not intended to limit the present invention, it should be noted that those of ordinary skill in the art can further make various modifications and variations without departing from the technical principles of the present invention, and these modifications and variations also should be considered to be within the scope of protection of the present invention.

What is claimed is:

1. A method for preparing a graphene/porous iron oxide nanorod composite, comprising steps of:

(1) mixing graphene oxide with a fibroin solution, the weight ratio of the graphene oxide to fibroin being less than or equal to 1:4, and adding hydrazine hydrate for reduction after pH is adjusted to alkaline, to obtain a graphene/fibroin composite;

(2) adding an iron source to the graphene/fibroin composite, and further stirring until complete dissolution to get a mixture;

(3) pouring the mixture into a reactor and performing a reaction at 120-200° C. for 8-36 h;
(4) naturally cooling to room temperature after the end of the reaction, centrifuging and drying the product, to obtain a solid powder; and
(5) calcinating the solid powder in an inert atmosphere at 320-450° C. for 3-8 h, and naturally cooling to room temperature, to get the graphene/porous iron oxide nanorod composite.

2. The method for preparing the graphene/porous iron oxide nanorod composite as claimed in claim 1, wherein the weight ratio of the graphene oxide to hydrazine hydrate is 1:(0.0004-20).

3. The method for preparing the graphene/porous iron oxide nanorod composite as claimed in claim 1, wherein the iron source is $FeCl_3 \cdot 6H_2O$, and the weight ratio of the graphene oxide to $FeCl_3 \cdot 6H_2O$ being 1:(20-60).

4. The method for preparing the graphene/porous iron oxide nanorod composite as claimed in claim 1, wherein in the step (1) the pH is 8-11.

\* \* \* \* \*